US007978703B2

(12) United States Patent
Pande et al.

(10) Patent No.: US 7,978,703 B2
(45) Date of Patent: *Jul. 12, 2011

(54) INTELLIGENT ALG FUNCTIONALITY IN NETWORKS SUPPORTING ENDPOINTS PERFORMING NETWORK ADDRESS TRANSLATION

(75) Inventors: Vinay J. Pande, San Jose, CA (US); Kaushik Biswas, San Jose, CA (US); Jayesh Chokshi, Cupertino, CA (US); Daniel G. Wing, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/724,271

(22) Filed: Mar. 15, 2010

(65) Prior Publication Data
US 2010/0172359 A1 Jul. 8, 2010

Related U.S. Application Data

(63) Continuation of application No. 11/646,762, filed on Dec. 27, 2006, now Pat. No. 7,693,150.

(51) Int. Cl.
*H04L 12/28* (2006.01)
*H04L 12/56* (2006.01)
*H04J 1/14* (2006.01)
*H04J 3/12* (2006.01)
*H04W 4/00* (2009.01)
*H04B 7/00* (2006.01)

(52) U.S. Cl. ........ 370/392; 370/401; 370/496; 370/522; 455/466; 455/515

(58) Field of Classification Search .................. 370/389, 370/392, 401, 496, 522; 455/466, 515
See application file for complete search history.

(56) References Cited

U.S. PATENT DOCUMENTS

| 6,963,982 | B1 | 11/2005 | Brustoloni et al. | |
|---|---|---|---|---|
| 7,693,150 | B2 * | 4/2010 | Pande et al. | 370/392 |
| 2006/0272009 | A1 | 11/2006 | Stott | |
| 2008/0080568 | A1 | 4/2008 | Hughes et al. | |
| 2008/0159306 | A1 | 7/2008 | Pande et al. | |

OTHER PUBLICATIONS

Non-Final Office Action dated Jun. 1, 2009 from parent U.S. Appl. No. 11/646,762.
Notice of Allowance dated Jun. 1, 2009 from parent U.S. Appl. No. 11/646,762.

(Continued)

*Primary Examiner* — Ronald Abelson
(74) *Attorney, Agent, or Firm* — Weaver Austin Villeneuve & Sampson LLP

(57) ABSTRACT

In one embodiment, a signaling message is received from an endpoint. It is determined from the signaling message whether, prior to sending the signaling message, the endpoint performed network address translation on the body of the signaling message. If it is determined from the signaling message that, prior to sending the signaling message, the endpoint did not perform network address translation on the body of the signaling message, application layer gateway functionality is applied to the body of the signaling message such that a modified signaling message is generated.

21 Claims, 5 Drawing Sheets

OTHER PUBLICATIONS

Allowed Claims from parent U.S. Appl. No. 11/646,762.

Rosenberg, J., et al. "STUN—Simple Traversal of User Datagram Protocol (UDP) Through Network Address Translators (NATs)," RFC 3489, Mar. 2003, 15 pages.

Rosenberg, J., "Interactive Connectivity Establishment (ICE): A Methodology for Network Address Translator (NAT) Traversal for the Session Initiation Protocol (SIP), draft-rosenberg-sipping-ice-00," Internet-Draft, downloaded from the internet Dec. 20, 2006 http://www.jdrosen.net/papers/draft-rosenberg-sipping-ice-00.html Feb. 24, 2003, 21 pages.

"Solving the Firewall and NAT Traversal Issues for Multimedia over IP Services", White Paper downloaded from the internet Dec. 20, 2006 http://www.newport-networks.com/whitepapers/net-traversal4.html Newport Networks, Ltd. copyright 2006.

* cited by examiner

FIG. 2A

Signaling message 200

| Header 202 | Body (e.g., Session Description Protocol) 204 |

FIG. 2B

Signaling message 206

| From 208 | To 210 | Body 204: Signaling message attribute 212 |

FIG. 2C

SIP signaling message where endpoint performs ICE 214

| From 208 | To 210 | Body 204: a=candidate 216 m=media name and transport address 218 |

FIG. 2D

SIP signaling message 220

| From 208 | To 210 | Body 204: m=media name and transport address 218 |

INTELLIGENT ALG FUNCTIONALITY IN NETWORKS SUPPORTING ENDPOINTS PERFORMING NETWORK ADDRESS TRANSLATION

CROSS-REFERENCE TO RELATED APPLICATIONS

This application is a continuation of U.S. patent application Ser. No. 11/646,762, entitled "INTELLIGENT ALG FUNCTIONALITY IN NETWORKS SUPPORTING ENDPOINTS PERFORMING NETWORK ADDRESS TRANSLATION," filed on Dec. 27, 2006 by Vinay J. Pande, which is incorporated herein by reference in its entirety.

BACKGROUND OF THE INVENTION

1. Technical Field

The present disclosure relates generally to network technology. More particularly, the present disclosure relates to methods and apparatus for implementing an Application Layer Gateway (ALG).

2. Description of the Related Art

Network address translation (NAT) is performed in a variety of situations. Often NAT involves translating addresses from public addresses to private addresses, and vice versa. More particularly, address translation may involve source address translation and/or destination address translation. NAT that involves port mapping may be referred to as network address port translation (NAPT). Thus, NAT may involve address translation, as well as port mapping.

Generally, NAT is typically performed on the header of a packet. However, some higher-layer protocols such as File Transfer Protocol (FTP) and Session Initiation Protocol (SIP) provide addresses and/or port numbers inside the body (i.e., payload) of the packet. If the endpoint sending such a packet lies behind a simple NAT firewall, the translation of the IP address(es) and/or port number(s) in the body of the packet by the NAT firewall makes the information in the body of the packet invalid.

An Application Layer Gateway (ALG) software module running on a NAT firewall device may be used to update any payload data made invalid by address translation. However, an endpoint that implements protocols such as Simple Traversal of User Datagram Protocol (UDP) Through Network Address Translators (NATs) (STUN) or Interactive Connectivity Establishment (ICE) may perform its own NAT translations on the body of packets it transmits. Since networks may include devices supporting various protocols or versions of such protocols, the result of the application of ALG functionality to packets transmitted by such devices is unpredictable.

BRIEF DESCRIPTION OF THE DRAWINGS

FIGS. 2A-2D illustrate examples of signaling messages that may be implemented in accordance with various embodiments of the invention.

DESCRIPTION OF EXAMPLE EMBODIMENTS

In the following description, numerous specific details are set forth in order to provide a thorough understanding of the disclosed embodiments. It will be obvious, however, to one skilled in the art, that the disclosed embodiments may be practiced without some or all of these specific details. In other instances, well known process steps have not been described in detail in order not to unnecessarily obscure the disclosed embodiments.

Overview

In one embodiment, a signaling message is received from an endpoint. It is determined from the signaling message whether, prior to sending the signaling message, the endpoint performed network address translation on the body of the signaling message. If it is determined from the signaling message that, prior to sending the signaling message, the endpoint did not perform network address translation on the body of the signaling message, application layer gateway functionality is applied to the body of the signaling message such that a modified signaling message is generated.

Specific Example Embodiments

Figure 1:
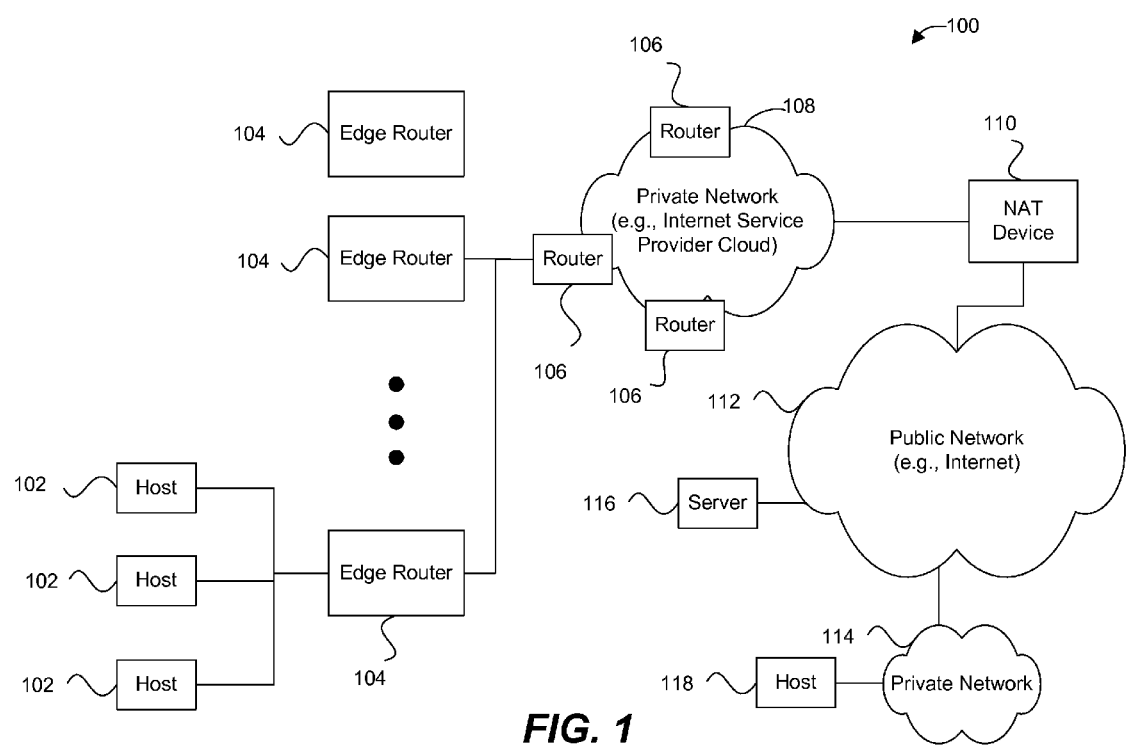
FIG. 1 is a block diagram illustrating an example of a system in which various embodiments of the invention may be implemented.

FIG. 1 is a diagrammatic representation of a network in which embodiments invention may be implemented in accordance with one embodiment of the present invention. As shown, the network 100 includes a private network 108 such as an Internet Service Provider (ISP) cloud coupled to a network address translation (NAT) device 110 and one or more edge routers 104. The private network 108 may also include one or more intermediary routers 106. Each edge router 104 may be coupled to one or more hosts 102.

The NAT device 110 is also coupled to a public network 112, which may be coupled to another private network 114. Each of the networks 108, 112, and 114 may be coupled with one or more devices. The NAT device 110 is operable to handle communication between the private network 108 and the public network 112, which is shown to include server 116. Network addresses (e.g., IP addresses) used by devices of the public network 112 are referred to as "outside" addresses with respect to the NAT device 110. Outside addresses may include addresses associated with devices coupled to the public network 112. Outside addresses may also include an address provided in a packet that is transmitted through public network 112 from another network, such as private network 114. An address from host 102 of private network 108, for example, is translated to be compatible with public network 112 as the data travels through network 112. Network addresses associated with devices of the private network 108 are referred to as "inside" addresses with respect to the NAT device 110.

Although each set of addresses are unique within their respective networks, the inside address realm or local networks 108 and 114 and public network 112 may include one or more addresses that overlap with each other. To avoid duplication of network addresses by two communicating endpoints, the NAT device 110 generally translates between addresses used within the private network 108 and addresses used within the public network 112.

In the illustrated embodiment, NAT device 110 translates local addresses of packets received from a private network 108 into global addresses to be output from the NAT device 110 to public network 112, and vice versa. The NAT device 110 also translates global addresses of packets received from public network 112 into local addresses to be output from the NAT device 110 to private network 108, and vice versa. The NAT device 110 may also (or alternatively) translate ports, such as TCP (Transmission Control Protocol) or UDP (User Datagram Protocol) ports, between the two realms. The NAT device 110 also maintains state information regarding each network address translation.

As set forth above, the NAT device 110 performs network address translation on a packet header, as necessary. In accordance with one embodiment, the NAT device 110 performs Application Layer Gateway (ALG) functionality on the body of the packet when various criteria are met. Stated another way, the NAT device 110 will not apply ALG functionality on the body of the packet when specific criteria are met, as will be described in further detail below. For instance, the NAT device 110 may not apply ALG functionality to a packet if the device that has transmitted the packet has already performed network address translation on the body of the packet.

The application of ALG functionality may include updating any payload data made invalid by address translation. Thus, the ALG functionality is capable of parsing and processing packets in the higher-level protocol in which the packet is transmitted. Moreover, the ALG functionality may support multiple high-level protocols that are supported within a network by various network devices. In some embodiments, the ALG functionality may convert network layer addresses found inside a payload between addresses acceptable by the hosts on either side of the firewall/NAT. The ALG functionality may include determining the location of one or more addresses in the payload based on the particular format used by the higher level application. The ALG functionality then can perform NAT on the embedded addresses as needed. For instance, an embedded inside address may be translated into an embedded outside address, and vice versa. Likewise, embedded ports may be translated from private to public ports, and vice versa.

In accordance with one embodiment, a packet that is received by the NAT device 110 is a signaling message. FIG. 2A is a diagram illustrating an example of a signaling message that may be implemented in accordance with various embodiments of the invention. More particularly, signaling message 200 includes a header 202 and a body 204. In accordance with one embodiment, the body 204 of the signaling message 202 may be composed in conformance with a Session Description Protocol (SDP). The Session Description Protocol (SDP) is typically used to describe multimedia sessions for the purpose of session announcement, session invitation and other forms of multimedia session initiation. SDP is purely a format for session description—it does not incorporate a transport protocol, and is intended to use with different transport protocols as appropriate, such as the Session Announcement Protocol (SAP), Session Initiation Protocol (SIP), Real-Time Streaming Protocol (RTSP), electronic mail using the MIME extensions, the File Transfer Protocol (FTP), Real Audio, H.323 or the Hypertext Transport Protocol (HTTP). Signaling messages can also be sent using email (as shown) or the WWW (World Wide Web). The body 204 of a signaling message transmitted in conformance with SDP may be referred to as a SDP session description. The body 204 of the signaling message may contain one or more addresses and/or ports that are pertinent to a subsequent message exchange.

In accordance with one embodiment, the signaling message 200 is transmitted in accordance with SIP in order to support Voice over IP (VoIP) calls. SIP is an application-layer control (signaling) protocol for creating, modifying, and terminating sessions with one or more participants. These sessions may include Internet telephone calls, multimedia distribution, and multimedia conferences. SIP works in concert with several other protocols and is only involved in the signaling portion of a communication session. As set forth above, SIP acts as a carrier for the Session Description Protocol (SDP), which describes the media content of the session (e.g. what IP ports to use). Often, SIP sessions are packet streams of the Real-time Transport Protocol (RTP). RTP is the carrier for the actual voice or video content in such packet streams.

As shown in FIG. 2B, a signaling message 206 may include a header specifying a "From" field 208 and a "To" field 210, such as where the signaling message 206 is sent using email. The signaling message 206 may indicate whether the endpoint that transmitted the signaling message 206 performed network translation on the body of the signaling message prior to sending the signaling message. For instance, the body 204 of the signaling message 206 may include a signaling message attribute 212 that indicates whether the endpoint performs network address translation on the body of the signaling message prior to sending the signaling message. As one example, when a particular signaling message attribute 212 is present in the body 204 of the signaling message 206, such presence may indicate that the endpoint performs network translation on a body of the signaling message prior to sending the signaling message. In other words, when the particular signaling message attribute 212 is not present in the body 204 of the signaling message 206, this may indicate that the endpoint has not performed network address translation on the body of the signaling message prior to sending the signaling message.

As set forth above, a number of protocols such as STUN and ICE enable an endpoint to perform network address translations on the body of a signaling message prior to its transmission. FIG. 2C is a diagram illustrating an exemplary simplified signaling message that may be transmitted by an endpoint performing ICE. In this example, the body 204 of such a signaling message 214 that conforms to SDP may include a signaling message attribute consisting of an "a=candidate" line 216, which may be provided as a session attribute line or a media attribute line of the body 204 of the signaling message 214. In this example, the presence of the "a=candidate" line 216 in the body 204 of the signaling message 214 indicates that the endpoint performs ICE. The body 204 of the signaling message 214 may include one or more addresses and/or ports that are pertinent to a subsequent message exchange. For instance, such addresses and/or ports may be provided in a media description of the body 204 of the signaling message 214. The media description that conforms to SDP typically takes the form of a "m=media name and transport address" line 218, as shown in FIG. 2C. In accordance with one embodiment, when the "a=candidate" line 216 is present indicating that the endpoint performs ICE, the NAT device interprets the presence of such an indication to mean that the endpoint performs its own NAT translations and therefore the NAT device does not perform ALG functionality on the body 204 of the signaling message 214. As a result, any transport address(es) provided at 218 remain intact.

FIG. 2D is a diagram illustrating an exemplary simplified signaling message 220 that may be transmitted by an endpoint that does not perform its own NAT translations in accordance with one embodiment of the invention. In this example, the absence of a signaling attribute such as the "a=candidate" line shown at 216 of FIG. 2C may indicate that the endpoint does not perform its own NAT translations. In accordance with one embodiment, when such a signaling attribute is not present in the body of the signaling message, the NAT device interprets the absence of such a signaling attribute to mean that the endpoint did not perform its own NAT translations. Therefore, the NAT device applies ALG functionality on the body 204 of the signaling message, as appropriate. As a result, any transport addresses provided at 218 may be translated or otherwise modified by the NAT device.

Figure 3:
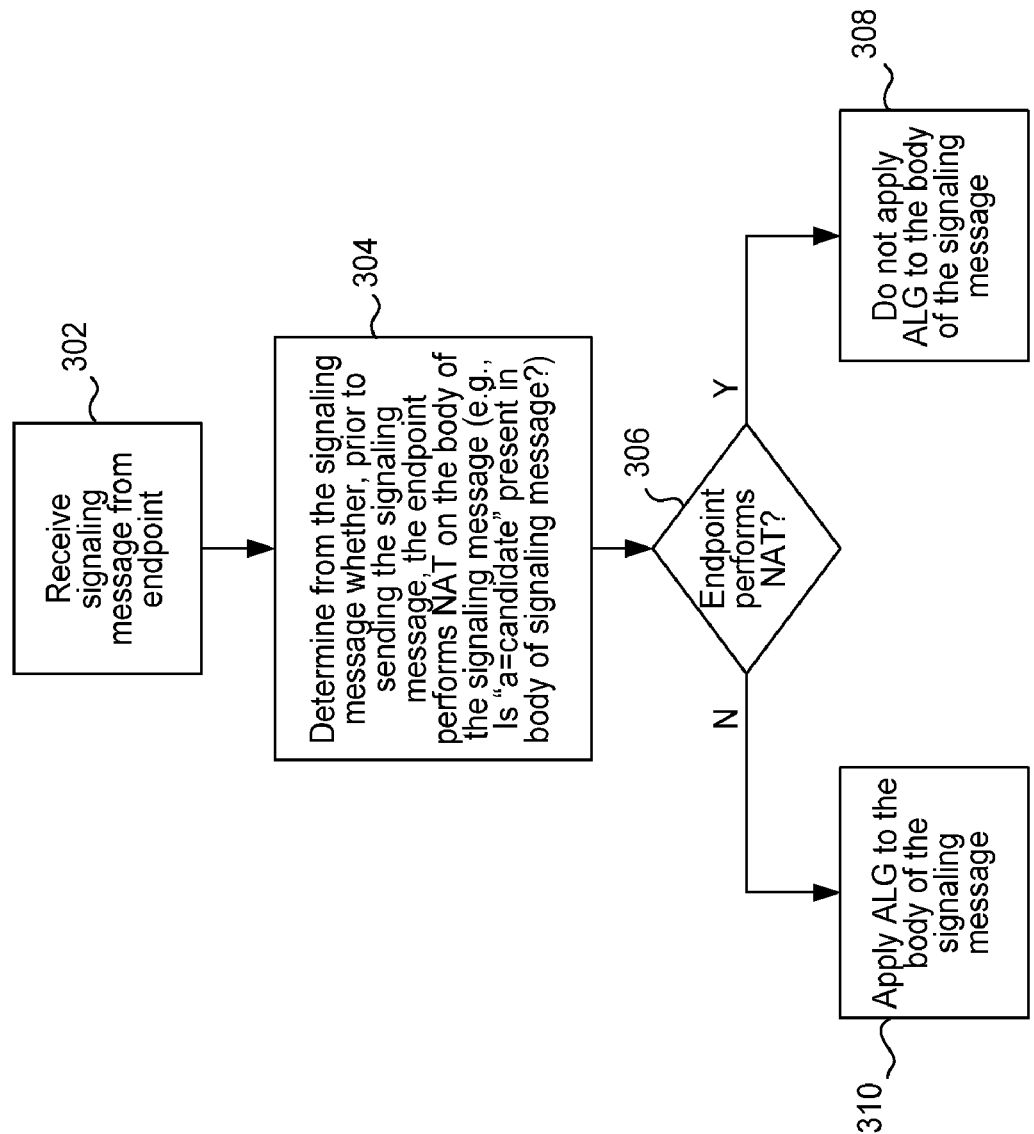
FIG. 3 is a process flow diagram illustrating a method of processing signaling messages in accordance with one embodiment of the invention.

FIG. 3 is a process flow diagram illustrating a method of processing signaling messages in accordance with one embodiment of the invention. A device such as a NAT device receives a signaling message from an endpoint at 302. The signaling message may indicate whether the endpoint performed network address translation on the body of the signaling message prior to sending the signaling message. Thus, the device determines from the signaling message whether, prior to sending the signaling message, the endpoint performed network address translation on the body of the signaling message at 304. For instance, the device may determine whether the signaling message contains a signaling attribute such as an "a=candidate" line. The presence (or absence) of a particular signaling attribute may indicate that the endpoint performed (or did not perform) network address translation on the body of the signaling message prior to sending the signaling message, as set forth above. For instance, the presence of a signaling attribute such as an "a=candidate" line may indicate that the endpoint performs ICE and therefore modified the body of the signaling message prior to sending the signaling message. It is important to note that the signaling attribute will vary corresponding to the protocol that is implemented. As a result, it may be desirable to determine whether the signaling message contains more than one specific signaling attribute, where each signaling attribute corresponds to a different protocol that is supported in the network.

If it has been determined that the endpoint performed network address translation on the body of the signaling message prior to sending the signaling message at 306, application layer gateway functionality is not applied to the body of the signaling message at 308. However, if it has been determined that the endpoint did not perform network address translation on the body of the signaling message prior to sending the signaling message at 306, application layer gateway functionality is applied to the body of the signaling message at 310 such that a modified signaling message is generated.

Figure 4:
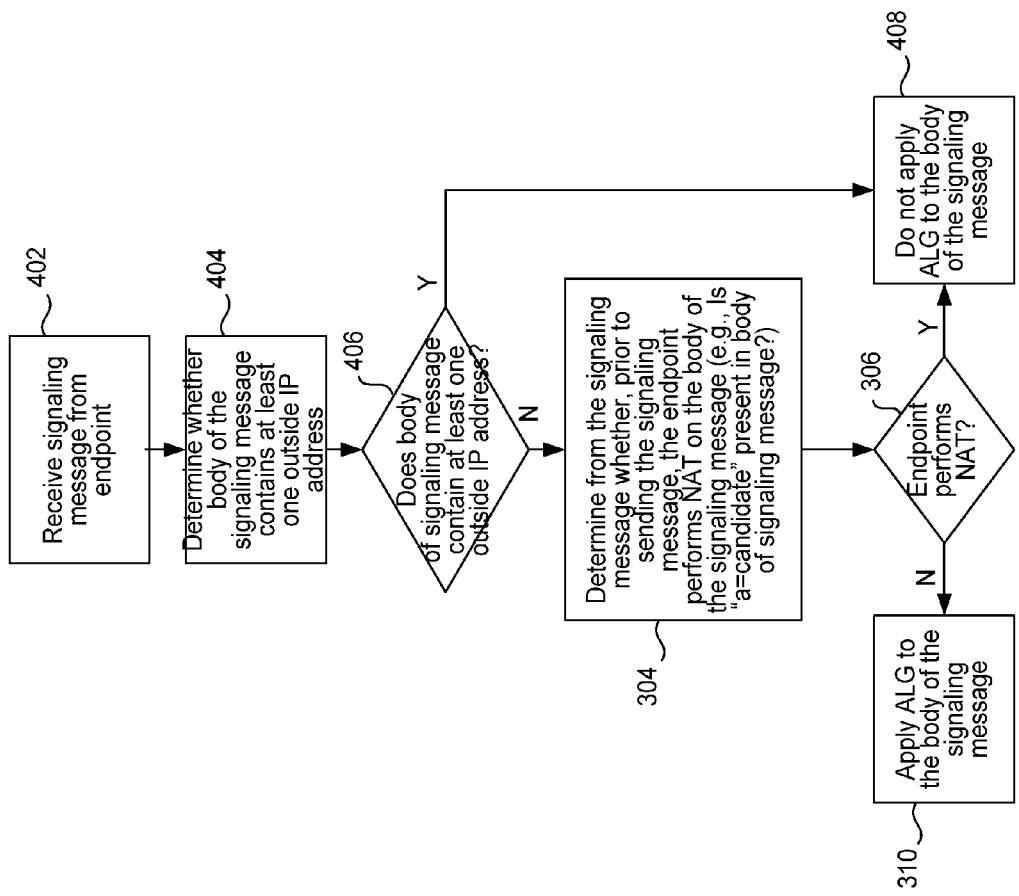
FIG. 4 is a process flow diagram illustrating a method of processing signaling messages in accordance with another embodiment of the invention.

FIG. 4 is a process flow diagram illustrating a method of processing signaling messages in accordance with another embodiment of the invention. A device such as a NAT device receives a signaling message from an endpoint at 402. It may be possible to detect whether the endpoint has performed network address translation on the body of the signaling message by determining whether the body of the signaling message includes at least one "outside" IP address at 404. More particularly, one or more addresses embedded in the body of the signaling message may be identified or obtained in order to make this determination. If the body of the signaling message contains at least one outside IP address at 406, this indicates that the endpoint has already performed network address translation on the body of the signaling message and therefore the device does not apply application layer gateway functionality to the body of the signaling message at 408.

If the body of the signaling message does not contain at least one outside IP address at 406, it is still possible that the endpoint has already performed network address translation on the body of the signaling message and therefore the device continues as set forth above with reference to FIG. 3 to determine from the signaling message whether, prior to sending the signaling message, the endpoint performed network address translation on the body of the signaling message at 304. More particularly, this determination may be made using another mechanism such as that set forth above with respect to 304 of FIG. 3. If it has been determined that the endpoint performed network address translation on the body of the signaling message prior to sending the signaling message at 306, application layer gateway functionality is not applied to the body of the signaling message at 408. However, if it has been determined that the endpoint did not perform network address translation on the body of the signaling message prior to sending the signaling message at 306, application layer gateway functionality is applied to the body of the signaling message at 310 such that a modified signaling message is generated.

The disclosed embodiments enable a device such as a NAT device to detect whether network address translation has already been performed on the body of a packet such as a signaling message. Upon detecting that translation has already been performed, translation of the body of the packet is not performed. As a result, addresses embedded in the body remain intact. In this manner, communication sessions in a network supporting devices that perform their own NAT translations may be established without disruption.

Generally, the techniques for performing network address translation and routing in accordance with various embodiments of the invention may be implemented on software and/or hardware. For example, they can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the packet processing system (e.g., NAT device or service provider edge box) may be implemented on a general-purpose network host machine such as a personal computer or workstation. Further, the invention may be at least partially implemented on a card (e.g., an interface card) for a network device or a general-purpose computing device.

Figure 5:
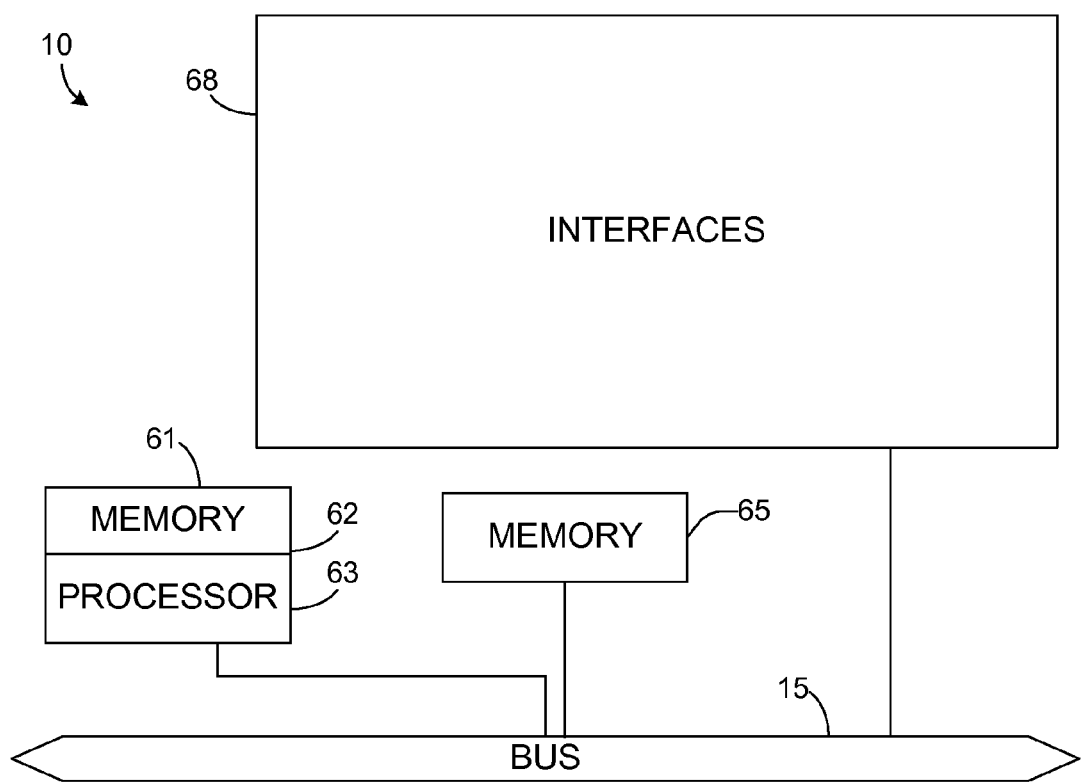
FIG. 5 is a diagrammatic representation of a router in which embodiments of the present invention may be implemented.

Referring now to FIG. 5, a router 10 suitable for implementing embodiments of the invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for determining whether an address is a private address, determining whether a binding is present for a private address, and translating a private address or a DNS payload address into a public pool address, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 5 is one specific router of the present invention, it is by no means the only router architecture on which the disclosed embodiments can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store a virtual route forwarding table for each virtual private network.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The disclosed embodiments may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing embodiments have been described in some detail for purposes of clarity of understanding, it will be apparent that certain changes and modifications may be practiced within the scope of the appended claims. For instance, although the disclosed embodiments are described with reference to specific protocols, these protocols are merely illustrative. Therefore, the disclosed embodiments may be used in systems implementing other protocols. Accordingly, the described embodiments should be taken as illustrative and not restrictive, and the invention should not be limited to the details given herein but should be defined by the following claims and their full scope of equivalents.

What is claimed is:

1. A method, comprising:
   receiving a signaling message from an endpoint;
   determining from the signaling message whether, prior to sending the signaling message, the endpoint performed network address translation on at least a portion of the signaling message; and
   applying application layer gateway functionality to the portion of the signaling message such that a modified signaling message is generated according to whether it is determined from the signaling message that, prior to sending the signaling message, the endpoint did not perform network address translation on the portion of the signaling message.

2. The method as recited in claim 1, further comprising:
   if it is determined from the signaling message that the endpoint performed network address translation on the portion of the signaling message prior to sending the signaling message, not applying application layer gateway functionality to the portion of the signaling message.

3. The method as recited in claim 1, further comprising:
   identifying a set of addresses embedded in the portion of the signaling message;
   determining whether the set of addresses embedded in the portion of the signaling message include at least one outside address; and
   if it is determined that the set of addresses embedded in the portion of the signaling message do not include at least one outside address and it is determined from the signaling message that, prior to sending the signaling message, the endpoint does not perform network address translation on the portion of the signaling message, applying application layer gateway functionality to the portion of the signaling message to translate one or more of the set of addresses embedded in the portion of the signaling message.

4. The method as recited in claim 1, further comprising:
   identifying a set of addresses embedded in the portion of the signaling message;
   determining whether the set of addresses embedded in the portion of the signaling message include at least one outside address; and
   if it is determined that the set of addresses embedded in the portion of the signaling message include at least one outside address, not applying application layer gateway functionality to the portion of the signaling message.

5. The method as recited in claim 1, wherein the signaling message conforms to Session Initiation Protocol, Real Time Streaming Protocol, File Transfer Protocol, Real Audio, electronic mail, Hypertext Transport Protocol or H.323 Protocol.

6. The method as recited in claim 1, wherein the portion of the signaling message conforms to a Session Description Protocol.

7. The method as recited in claim 1, further comprising:
parsing the signaling message to determine whether the signaling message contains a signaling message attribute indicating that, prior to sending the signaling message, the endpoint performed network address translation on a portion of the signaling message; and
applying application layer gateway functionality to the portion of the signaling message if the signaling message does not contain a signaling message attribute indicating that, prior to sending the signaling message, the endpoint performed network address translation on a portion of the signaling message.

8. The method as recited in claim 7, further comprising:
not applying application layer gateway functionality to the portion of the signaling message if the signaling message contains a signaling message attribute indicating that, prior to sending the signaling message, the endpoint performed network address translation on a portion of the signaling message.

9. The method as recited in claim 1, wherein the portion of the signaling message contains at least one of one or more addresses or one or more ports, wherein the addresses or ports contained in the portion of the signaling message are pertinent to a subsequent message exchange.

10. An apparatus, comprising:
means for receiving a signaling message from an endpoint;
means for determining from the signaling message whether, prior to sending the signaling message, the endpoint performed network address translation on a portion of the signaling message; and
means for applying application layer gateway functionality to the portion of the signaling message such that a modified signaling message is generated according to whether it is determined from the signaling message that, prior to sending the signaling message, the endpoint did not perform network address translation on the portion of the signaling message.

11. An apparatus, comprising:
a processor; and
a memory, at least one of the processor or the memory being adapted for:
receiving a signaling message from an endpoint;
determining from the signaling message whether, prior to sending the signaling message, the endpoint performed network address translation on a portion of the signaling message; and
applying application layer gateway functionality to the portion of the signaling message such that a modified signaling message is generated according to whether it is determined from the signaling message that, prior to sending the signaling message, the endpoint did not perform network address translation on the portion of the signaling message.

12. The apparatus as recited in claim 11, at least one of the processor or the memory being further adapted for:
not applying application layer gateway functionality to the portion of the signaling message if it is determined from the signaling message that the endpoint performed network address translation on the portion of the signaling message prior to sending the signaling message.

13. The apparatus as recited in claim 11, at least one of the processor or the memory being further adapted for:
identifying a set of addresses embedded in the portion of the signaling message;
determining whether the set of addresses embedded in the portion of the signaling message include at least one outside address; and
if it is determined that the set of addresses embedded in the portion of the signaling message do not include at least one outside address and it is determined from the signaling message that, prior to sending the signaling message, the endpoint does not perform network address translation on the portion of the signaling message, applying application layer gateway functionality to the portion of the signaling message to translate one or more of the set of addresses embedded in the portion of the signaling message.

14. The apparatus as recited in claim 11, at least one of the processor or the memory being further adapted for:
identifying a set of addresses embedded in the portion of the signaling message;
determining whether the set of addresses embedded in the portion of the signaling message include at least one outside address; and
if it is determined that the set of addresses embedded in the portion of the signaling message include at least one outside address, not applying application layer gateway functionality to the portion of the signaling message.

15. The apparatus as recited in claim 11, wherein the signaling message conforms to Session Initiation Protocol, Real Time Streaming Protocol, File Transfer Protocol, Real Audio, electronic mail, Hypertext Transport Protocol or H.323 Protocol.

16. The apparatus as recited in claim 11, wherein the portion of the signaling message conforms to a Session Description Protocol.

17. The apparatus as recited in claim 11, at least one of the processor or the memory being further adapted for:
parsing the signaling message to determine whether the signaling message contains a signaling message attribute indicating that, prior to sending the signaling message, the endpoint performed network address translation on a portion of the signaling message; and
applying application layer gateway functionality to the portion of the signaling message if the signaling message does not contain a signaling message attribute indicating that, prior to sending the signaling message, the endpoint performed network address translation on a portion of the signaling message.

18. The apparatus as recited in claim 17, at least one of the processor or the memory being further adapted for:
not applying application layer gateway functionality to the portion of the signaling message if the signaling message contains a signaling message attribute indicating that, prior to sending the signaling message, the endpoint performed network address translation on a portion of the signaling message.

19. The apparatus as recited in claim 17, wherein the portion of the signaling message conforms to a Session Description Protocol.

20. The apparatus as recited in claim 11, wherein the portion of the signaling message contains at least one of one or more addresses or one or more ports, wherein the addresses or ports contained in the portion of the signaling message are pertinent to a subsequent message exchange.

21. The method as recited in claim 1, wherein applying application layer gateway functionality to the portion of the signaling message such that a modified signaling message is generated comprises:
applying application layer gateway functionality to the portion of the signaling message if it is determined from the signaling message that, prior to sending the signaling message, the endpoint did not perform network address translation on the portion of the signaling message.

* * * * *